US006657345B2

(12) United States Patent
Shinozaki

(10) Patent No.: US 6,657,345 B2
(45) Date of Patent: Dec. 2, 2003

(54) MAGNETIC BEARING CONTROLLER

(75) Inventor: Hiroyuki Shinozaki, Tokyo (JP)

(73) Assignee: Ebara Corporation, Tokyo (JP)

( * ) Notice: Subject to any disclaimer, the term of this patent is extended or adjusted under 35 U.S.C. 154(b) by 4 days.

(21) Appl. No.: 10/034,123

(22) Filed: Jan. 3, 2002

(65) Prior Publication Data
US 2002/0096954 A1 Jul. 25, 2002

Related U.S. Application Data

(62) Division of application No. 09/600,116, filed on Jul. 12, 2000, now Pat. No. 6,346,757.

(30) Foreign Application Priority Data

Feb. 12, 1998 (JP) .............................................. 10-46296

(51) Int. Cl.[7] ................................................ H02K 7/09
(52) U.S. Cl. ....................................... 310/90.5; 310/51
(58) Field of Search ............................ 310/90.5, 90, 51; 318/606, 607; 364/508; 333/167, 175, 176; 324/207.12

(56) References Cited

U.S. PATENT DOCUMENTS

| | | | |
|---|---|---|---|
| 3,792,473 A | * 2/1974 | Sawicki | 434/106 R |
| 3,800,125 A | 3/1974 | Cleary, Jr. | 235/150.2 |
| 4,686,404 A | 8/1987 | Nakazeki et al. | 310/90.5 |
| 4,841,212 A | 6/1989 | Matsushita et al. | 318/607 |
| 4,885,491 A | 12/1989 | Hiyama et al. | 310/90.5 |
| 4,929,874 A | * 5/1990 | Mizuno et al. | 318/128 |
| 4,992,714 A | 2/1991 | Matsushita et al. | 318/625 |
| 4,999,534 A | * 3/1991 | Andrianos | 310/90.5 |
| 5,107,210 A | * 4/1992 | Shirao et al. | 324/207.12 |
| 5,703,424 A | 12/1997 | Dorman | |
| 5,708,312 A | 1/1998 | Rosen et al. | 310/90 |
| 5,736,801 A | 4/1998 | Murakami | 310/90.5 |
| 6,111,333 A | 8/2000 | Takahashi et al. | 310/90.5 |
| 6,191,513 B1 | 2/2001 | Chen et al. | 310/90 |
| 6,346,757 B1 | * 2/2002 | Shinozaki | 310/90.5 |

FOREIGN PATENT DOCUMENTS

| | | |
|---|---|---|
| EP | 0 193 609 | 9/1986 |
| FR | 2 336 602 | 7/1977 |
| FR | 2 336 602 | 7/1997 |
| JP | 05118329 A | 5/1993 |
| JP | 59212519 | 12/1994 |

OTHER PUBLICATIONS

R. Siegwart et al.; vol. 43, No. 12, pp. 549–553, Dec. 1, 1995. See PCT search report.
Patent Abstracts of Japan, Publication No. 59103019, dated Jun. 14, 1984. See PCT search report.
"Magnetic Suspension Technology—Magnetic Levitation Systems and Magnetic Bearings–", The Institute of Electrical Engineers of Japan (Jun. 30, 1993).
"New Technology Combination Series: vol 1—Fundamentals and Application of Magnetic Bearings", Japan Society of Mechanical Engineers (Oct. 1, 1995).
Communication from European Patent Office in Application No. 02 02 7525 dated Mar. 20, 2003 enclosing copy of European Search Report.

* cited by examiner

Primary Examiner—Thanh Lam
(74) Attorney, Agent, or Firm—Armstrong, Westerman & Hattori, LLP

(57) ABSTRACT

It is an object of the present invention to provide magnetic bearing controller which is able to levitate the controlled object stably by using controlled magnetic forces. In the magnetic bearing controller which supplies a controlled current to an electromagnet for levitating a rotating body at a predetermined position, the controller is provided with an eliminator unit for eliminating frequency components of frequency area which is used by the status detector unit. The eliminator unit is inserted between signal amplifier unit and power amplifier unit for generating controlled current.

6 Claims, 12 Drawing Sheets

MAGNETIC BEARING CONTROLLER

This is a division of application Ser. No. 09/608,116, filed Jul. 12, 2000, now U.S. Pat. No. 6,346,757.

TECHNICAL FIELD

The present invention relates to a magnetic bearing controller, and more particularly to a magnetic bearing controller which controls a levitated rotating body actively by controlling magnetic force, which is generated by electromagnets by supplying controlled current thereto, whereby the current is controlled by pulse width modulation, and the rotating body is controlled in accordance with the status signals, such as detected displacement sensor signals thereof.

BACKGROUND ART

Recently, a magnetic bearing device is becoming to be widely used in the rotary machines in the various fields. The magnetic bearing device levitates and supports a rotating body without contact by magnetic force, which is generated by electromagnet. The advantages of the rotary machines equipped with the magnetic bearings are; abrasion dusts free, maintenance free because lubrication oil is not used, high-speed rotatability, and reduction of noises.

The magnetic bearings are also suitable when these are used in rotary machines, which are disposed in extreme clean atmospheres, such as clean rooms for semiconductor manufacturing. Because the magnetic bearings need no lubrication oil and do not generate abrasion dust, the semiconductor wafers are prevented from being contaminated. Therefore magnetic bearings are advantageous when these are used in clean space, vacuumed space, and so on. Especially in the vacuum space, friction coefficient of usual mechanical bearings becomes extremely large; therefore the magnetic bearings are suitable because there is no problem for the magnetic bearings which support the axes without contact.

FIG. 1 shows a general circuit configuration of a magnetic bearing controller, which controls a levitated rotating body actively by controlling current supply for the electromagnets. The electromagnets are disposed around the rotating body nearby for applying magnetic forces thereto. When the rotating body is levitated and supported by magnetic forces generated by electromagnets without contact thereto, the controlled object of the system is the rotating body, for example, a position thereof. The displacement X of the rotating body comparing the command position $X_0$ is detected by status detector unit, namely displacement sensor unit 11 in this case. The detected position X is compared with the command position $X_0$ in the deviation circuit, and a difference $\Delta X$ between detected position X and command position $X_0$ is inputted to compensator unit 12.

The compensator unit comprises of a control circuit, such as PID (Proportional plus Integral plus Derivative) control circuit, and generates an output signal so as to control that the difference $\Delta X$ between detected position X and command position $X_0$ becomes zero. An output signal of the compensator unit 12 is inputted into signal amplifier unit 13, where the signal is amplified and the amplitude of the signal is limited by a limiter circuit(limiter).

Power amplifier unit 14 generates a controlled current for supplying to electromagnet 15 corresponding with the output signal of the signal amplifier unit 13. The power amplifier unit 14 includes a pulse width modulation circuit for supplying controlled current, which is pulse width modulated thereby into coils of electromagnets 15. The electromagnet 15 generates a magnetic attractive force in accordance with amount of the controlled current. The magnetic attractive force is applied to the controlled object 16, namely the rotating body in this case, and the controlled object is moved so as to be the difference $\Delta X$ is decreased to be zero, namely the detected position X moves to the command position $X_0$. By the above mentioned feedback control, the controlled object 16 (rotating body in this case) is controlled to be stably positioned at the command position $X_0$, even if disturbance force is applied from outwards to the controlled object 15 so as to disturb the position thereof.

In the magnetic bearing controller, a displacement sensor is usually employed as the status detector unit 11 for detecting the status, which is displacement X comparing to the command position $X_0$ in this case. One of typical displacement sensor is an induction type displacement sensor, which has a core of magnetic material with coils wound thereof. According to the inductance type displacement sensor, the displacement of the controlled object which has a magnetic material fixed thereon is measured by the detection of variation of the inductance of the coils thereof.

FIG. 2 shows a detail of signal amplifier unit 13 and a portion of power amplifier unit 14, which includes PWM (Pulse Width Modulation) circuits. The output of compensator unit 12 is inputted to the signal amplifier unit 13 which comprises of an amplitude limiter 25, a deviation circuit 29, a signal amplifier 28, another amplitude limiter 29 and so on. An output of DC signal generator 26 for setting bias DC current is inputted to the deviation circuit 29 for adding the output signal thereto. The power amplifier unit 14 comprises of a PWM circuit having a comparator circuit 31 and a chopping wave generator 32, and a power amplifier circuit 35 which amplifies the output signal of the comparator circuit 31 to the actual current to be supplied to the coils of electromagnets 21.

The output current of the power amplifier 35 is supplied to the coils of electromagnets 21 as a controlled current, thereby controlled magnetic force is generated by electromagnets 21, and applied to the controlled object (rotating body) 22 for controlling the position thereof. The levitated actual position of the controlled object 22 is detected by the status detector, namely the inductance type displacement sensor 23 in this case. The controlled current which is applied to the coils of the electromagnets is detected by a current sensor 36, and lower frequency components of the output signal of the current sensor are returned to the deviation circuit 29 by a feedback loop through a low pass filter 39 for stopping higher frequency components which are corresponding to the frequency components of the PWM signals of the controlled current.

As above mentioned, the signal amplifier unit 13 is comprised of the signal amplifier 28 for amplifying an output signal of compensator unit 12 and the limiter 29 for limiting the amplitude of the amplified signal by the amplifier 28. These circuits are inserted at the front end of the PWM circuit, which comprises of the comparator 31 and the chopping wave generator 32. For driving the coils of electromagnets 21 which are inductive load, relatively large gain, for example 10 through 100 times amplification is required by the signal amplifier 28 which amplifies the output signal of the compensator unit 12 for inputting to the PWM circuit 31 of the power amplifier unit 14.

However, there is a problem that output signal of the signal amplifier unit 13 is deformed to be a rectangular shaped waveform from input sine shaped waveform by passing through the deviation circuit 27, the signal amplifier 28, and the amplitude limiter 29. FIGS. 3A through 3C show the deformation of waveform and frequency spectrum of the deformed waveform. FIG. 3A shows an input signal of sine waveform of 1 kHz, which is inputted to the signal amplifier unit 13. FIG. 3B shows a waveform of controlled current of 1 kHz corresponding to FIG. 3A which flows in the coils of electromagnets showing a rectangular shape. The reason of such deformation of the waveform is estimated that a phase difference is generated in the deviation circuit 27 between input signal and feedback signal, and that the output signal of the deviation circuit is amplified in the signal amplifier 28 including phase differences therebetween and saturated therein by the power supply voltage (±15 V). Therefore, the input signal of the PWM circuit 31 becomes rectangular shaped waveform from original sine shaped waveform by passing through the signal amplifier unit 13.

Accordingly, the controlled current flowing in the coils of electromagnets 21 includes n times harmonic components of fundamental frequency of input sine wave, and the frequency spectrum distribution is shown in FIG. 3C. As shown in FIG. 3C, n times harmonic components are generated from fundamental frequency of input sine wave of 1 kHz. The frequency area where the harmonic components are distributed exceeds more than 10 kHz as shown by circle in FIG. 3C. Further, frequency spectrum distributions over 100 kHz are caused by the PWM circuit 31 for generating pulse width modulated controlled currents, which are modulated by for example 90 kHz chopping frequency.

FIG. 4A shows an input signal of sine waveform of 500 Hz, which is inputted to the signal amplifier unit 13. FIG. 4B shows a waveform of controlled current of 500 Hz corresponding to FIG. 4A which flows in the coils of electromagnets showing a rectangular shape. FIG. 4C shows frequency spectrum distribution of the controlled current corresponding to 500 Hz of FIG. 4B. In the same way as 1 kHz input signal form, sine wave input signal is deformed to be rectangular shaped waveform by passing through the signal amplifier unit 13, and the controlled current is modulated in accordance with the deformed waveform, which flows in the coils of electromagnets. The frequency spectrum distribution includes many n times harmonic components in higher frequency area exceeding more than 10 kHz. It is a problem that harmonic components are distributing nearby 10 kHz frequency area, which is shown by a circle in FIG. 4C.

FIG. 5 shows frequency areas, which are used, in the magnetic bearing controller. Area ① is a frequency area of less than several kHz which is used by the detected signals of displacement sensor, and original controlled currents in the coils of electromagnets. Namely, area ① is used for controlling the rotating body which is detected by the displacement sensor, and controlled by magnetic forces without contact by controlled currents in the coils of electromagnets.

Area ② is a frequency area which is used by the inductance type displacement sensor. The inductance type displacement sensor uses an amplitude modulated signal of, for example, 10 kHz frequency as a fundamental frequency. In accordance with an amount of variation of inductance, the amplitude of the fundamental frequency wave is modulated by the amplitude modulation, and then the position of the rotating body is detected by the change of inductance, namely detecting the amplitude of the modulated signal thereof. Therefore, the frequency spectrums are distributed nearby 10 kHz by the operation of induction type displacement sensor.

Area ③ is a frequency area which is used by the PWM circuit 31 for generating controlled current which is supplied to the coils of electromagnets. The PWM circuit 31 uses 90 kHz chopping wave as a fundamental frequency, then the PWM circuit 31 generates the fundamental frequency component and harmonics frequency components by the PWM waveform which are distributed widely over 90 kHz.

FIG. 6 shows a frequency spectrum distribution of more than 1 kHz on which the frequency spectrum distribution that is shown in FIG. 3C or FIG. 4C is superimposed. The inductance type displacement sensor uses nearby 10 kHz frequency area for detecting the displacement of the rotating body by the amplitude modulation of fundamental 10 kHz frequency. However, the frequency area that is used by the inductance type displacement sensor is superimposed by n times harmonics components of the controlled current in the coils of electromagnets. The superimposed signals of two kinds of frequency areas cause the displacement sensor output signal to be deformed or disturbed by harmonics noises of controlled current, and it causes to injure the controllability of the magnetic bearing seriously. Therefore, in a serious case, the controller cannot control the rotating body to be levitated.

DISCLOSURE OF INVENTION

It is therefore an object of the present invention to provide a magnetic bearing controller which is able to levitate the controlled object stably by using controlled magnetic forces, even if the status detector unit employs relatively low fundamental frequency for detecting the status of the controlled object.

According to the present invention, there is provided a magnetic bearing controller for supplying a controlled current to an electromagnet for levitating a rotating body at a predetermined position, the controller comprising: an electromagnet for generating magnetic force by the controlled current; a power amplifier unit for supplying the controlled current to the electromagnet, the controlled current being pulse width modulated; a signal amplifier unit for amplifying signal before inputting to the power amplifier; a status detector unit for detecting a status of the rotating body, the rotating body being levitated by magnetic force which is generated by the electromagnet according to the controlled current; and an eliminator unit for eliminating frequency components of frequency area which is used by the status detector unit, the eliminator unit being inserted between the signal amplifier unit and the power amplifier unit.

Accordingly, as an eliminator is inserted between the signal amplifier unit and the power amplifier unit for eliminating frequency components of frequency area which is used by the status detector unit, the harmonics components which are generated by the signal amplifier unit, are eliminated by the eliminator. Then the input signal to the power amplifier unit does not contain the frequency components of frequency area which is used by the status detector unit, and the controlled current which is supplied to the electromagnet by the power amplifier unit also does not contain the frequency components of frequency area which is used by the status detector unit. Therefore, the status detector unit is prevented from malfunction, which is caused by harmonics components generated by the signal amplifier unit, and the magnetic bearing controller is able to operate stably and rapidly for controlling the controlled object.

The power amplifier unit is provided with a pulse width modulation circuit which comprises of comparator for comparing an input signal with chopper wave signal, and the eliminator is connected at the front end of said comparator. Accordingly, harmonics components of the frequency area, which is used by the status detector unit, are eliminated at the front end of the pulse width modulation circuit, and the status detector is prevented from being disturbed by harmonics noises which are contained in the controlled current.

The status detector is an induction type displacement sensor. Accordingly, an induction type displacement sensor is able to be adopted as the status detector, which is easily available and generally or widely used in the industry. Furthermore, the fundamental frequency of the sensor is able to be lowered for suitably using in such as canned encapsulated type magnetic bearing.

The eliminator is a band eliminator filter. Accordingly, the harmonics components of the frequency area which is used by the status detector unit, is effectively eliminated easily.

BEST MODE FOR CARRYING OUT THE INVENTION

Figure 1:
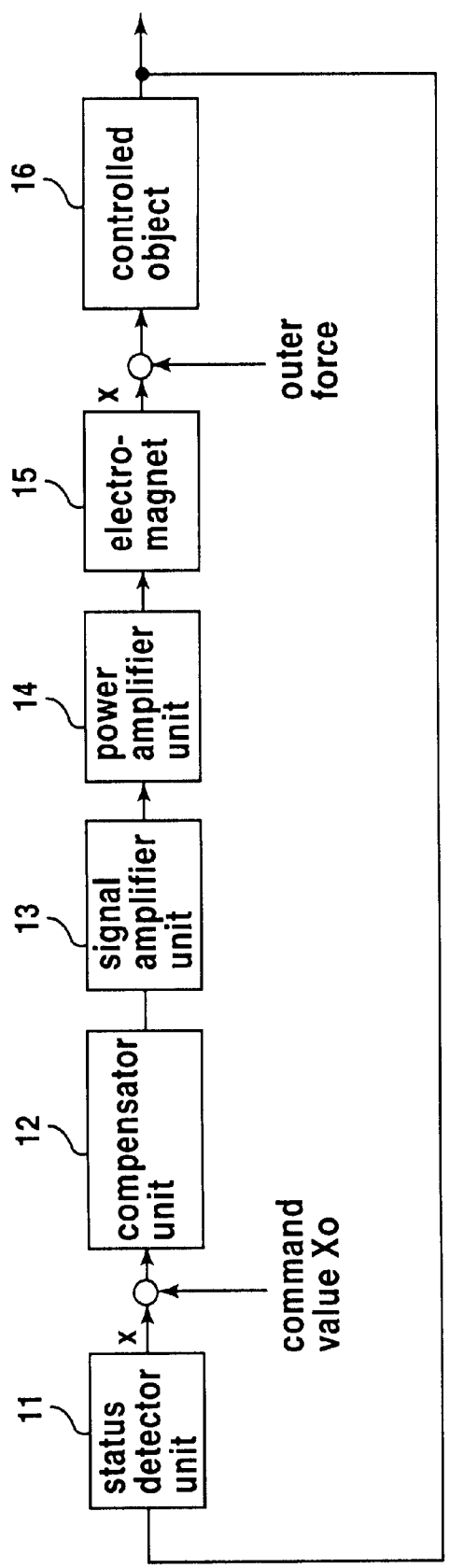
FIG. 1 is a block diagram showing a general circuit configuration of the magnetic bearing controller.
Figure 2:
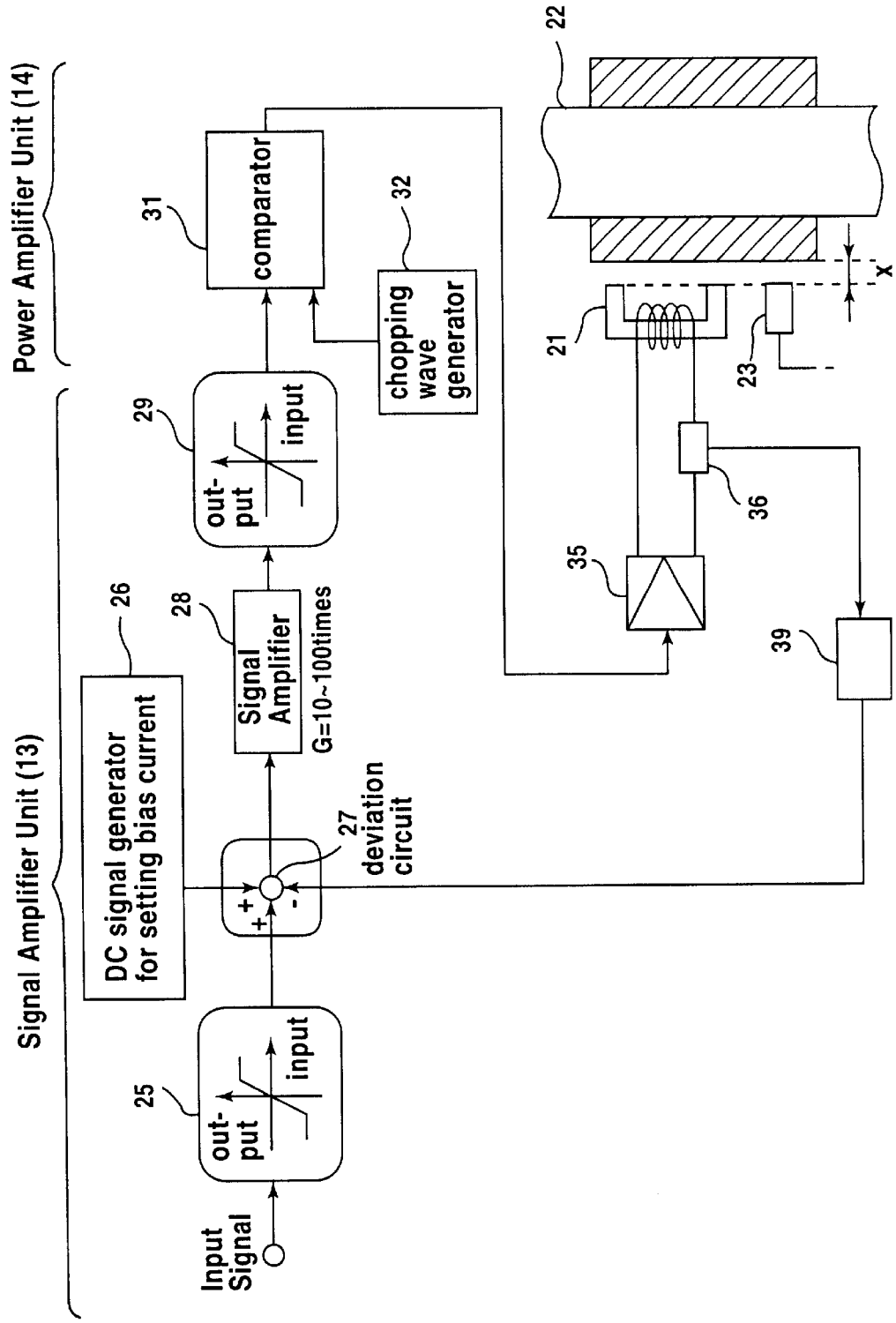
FIG. 2 is a schematic view showing detail configuration of a portion of the conventional magnetic bearing controller.
Figure 7:
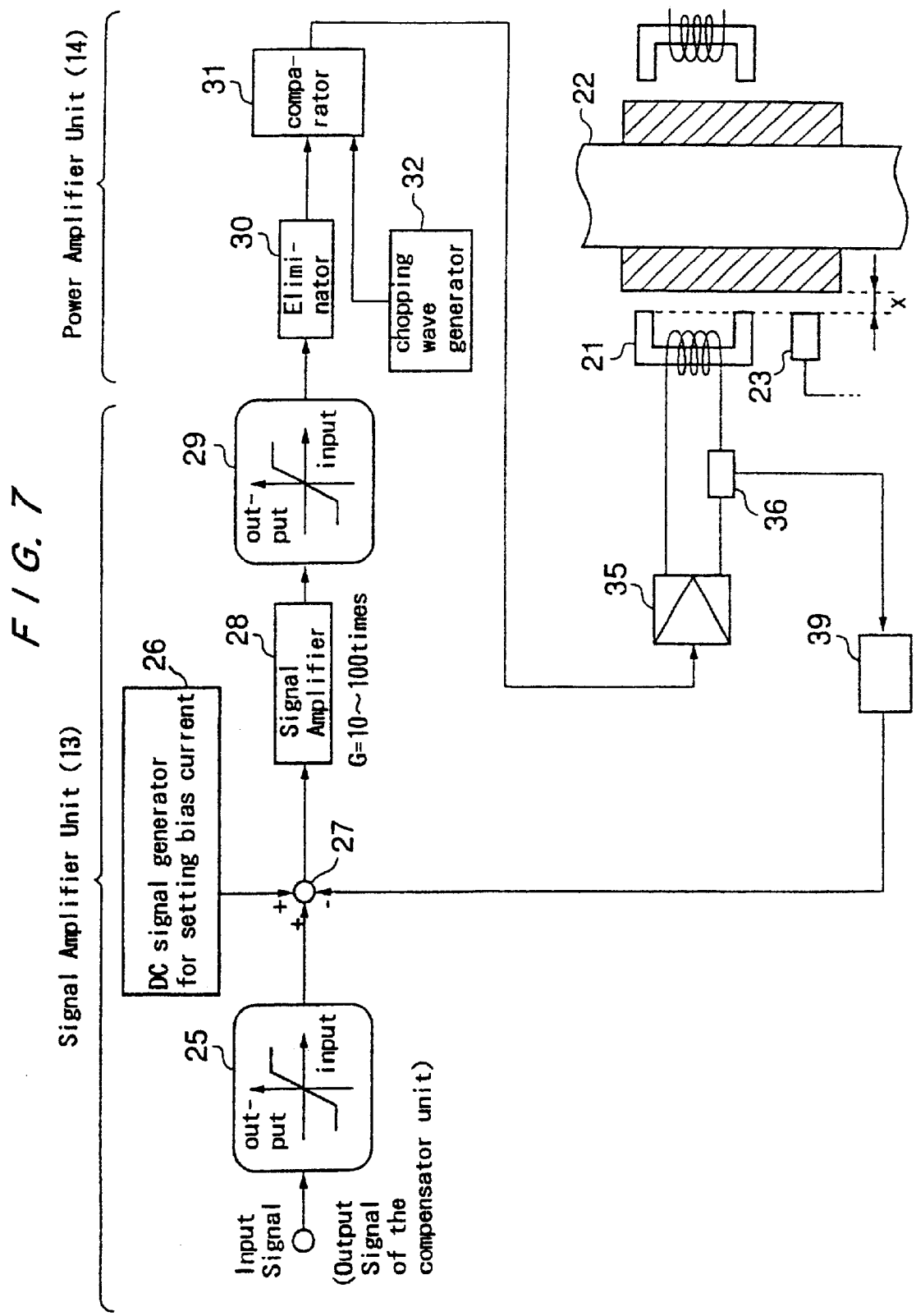
FIG. 7 is a schematic view showing detail configuration of a portion of an embodiment of the magnetic bearing controller according to the present invention.

FIG. 7 shows an embodiment of circuit configuration of the signal amplifier unit and the power amplifier unit according to the present invention. As shown in FIG. 7, the magnetic bearing is comprised of electromagnet 21 for producing magnetic force and rotating body 22 which is levitated and supported by the magnetic force generated by the electromagnet 21, thereby the levitated position of the rotating body 22 is controlled actively by controlled current which is supplied by the power amplifier unit 14. FIG. 7 shows only a portion of controller circuit configuration, namely an electromagnet 21 and corresponding circuit portion thereto. An inductance type displacement sensor 23 is being disposed nearby the rotating body 22 for detecting the position X thereof. The output signal of the displacement sensor 23 is inputted to the compensator unit 12 (not shown in FIG. 7) for generating control signal so as to keep the levitated position of the rotating body 22 at command position, as described before with referring to FIG. 1.

The output signal of the compensator unit is inputted to the amplitude limiter circuit 25, and the amplitude of the signal is limited in a range as shown in FIG. 7. The output signal of the limiter 25 is inputted to the deviation circuit 27, where DC signal of DC signal generator 26 for setting bias current is added thereto for giving bias voltage. The output signal of the deviation circuit 27 is inputted to the signal amplifier 28 where the signal is amplified by the gain of 10–100 times amplification.

Figure 8:
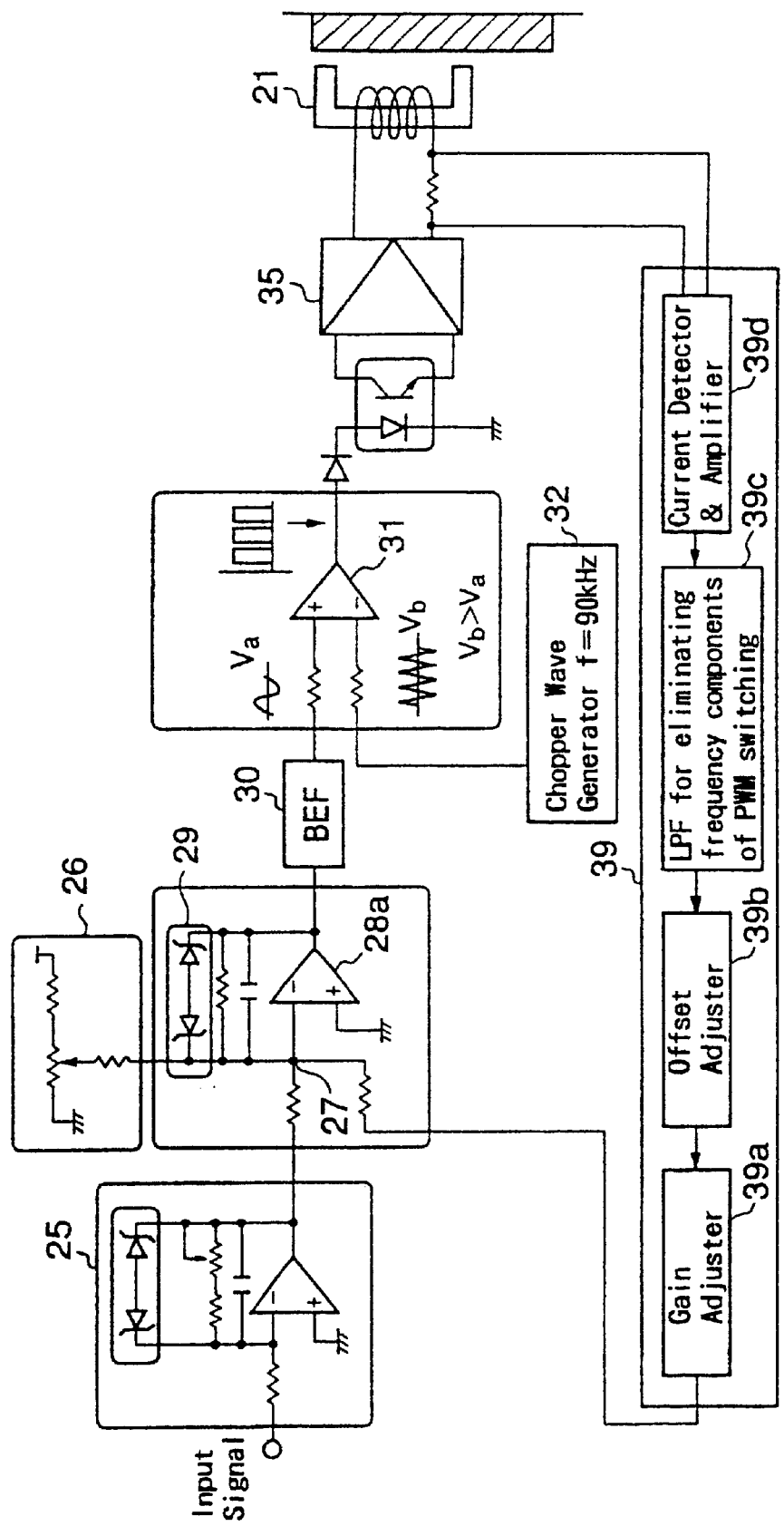
FIG. 8 is a schematic view showing detail configuration of a portion of signal amplifier unit and power amplifier unit of the magnetic bearing controller shown in FIG. 7.

Actual circuits are shown in FIG. 8, DC signal generator 26, deviation circuit 27 and signal amplifier 28 are integrally configured by using operational amplifiers, and have functions of adding, amplifying and amplitude limiting. The amplitude limiter circuit (limiter) 25 comprises of operational amplifier, zener diode, and resistance circuit for dividing the applied voltage. The limiter 25 produces a function that if amplitude of input signal is larger than a predetermined range, then the amplitude is limited to the predetermined value of the range. DC signal generator 26 for setting bias current comprises of DC voltage signal generator having variable resistor such as volume for adjusting DC voltage or DC current. The deviation circuit 27 comprises of (−) side terminal portion of the operational amplifier 28a. The output voltage terminal of DC signal generator 26, output signal line of the limiter 25 and output signal line of current feedback unit 39 for producing feedback signal of controlled current are connected to the input terminal 27 of the operational amplifier 28a. The signal amplifier 28 comprises of a combination of operational amplifier 28a and resistors, which are connected thereto. Also, the limiter 29 comprises of a combination of zener diode and operational amplifier 28a.

Figure 9A:
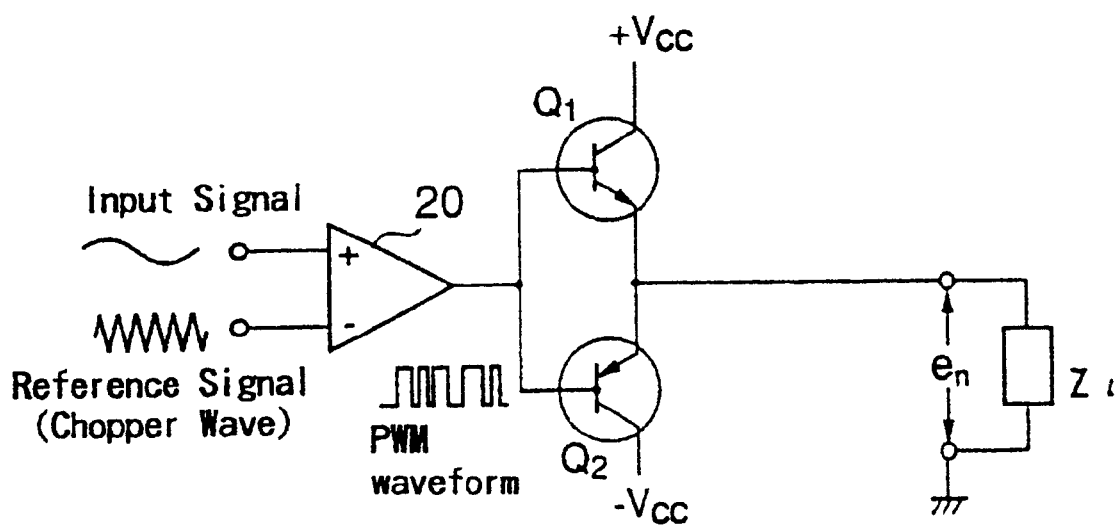
FIG. 9A is a circuit diagram of the PWM circuit and FIG. 9B is a graph showing the operation of the circuit shown in FIG. 9A.
Figure 9B:
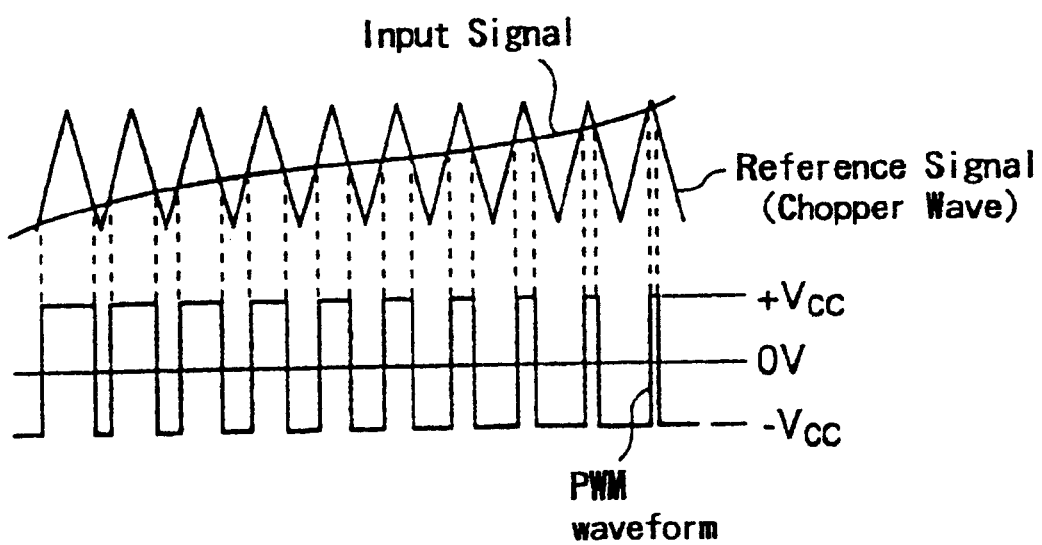

The comparator 31 generates PWM signal by comparing input signal with output signal of chopper wave generator 32. FIG. 9A shows a circuit configuration of the pulse width modulator 31, in which comparator 20 compares input signal with reference signal of chopper waveform, thus generates PWM signal waveform. As shown in FIG. 9B, the intervals between cross points of input signal and reference signal are discontinuously outputted with DC amplitude to form the PWM waveform. Therefore, amplitude of analog input signal to the power amplifier unit 14 is modulated by chopper wave reference signal to generate pulse width modulated output signal. Thereafter, the signal is amplified by an amplifier, which is comprised of transistors $Q_1$ and $Q_2$ to form output PWM signal.

Namely, as shown in FIG. 9B, the pulse width modulation is carried out by comparing an amplitude of input signal Va with reference chopper wave signal Vb in the comparator 20. When reference chopper wave signal Vb is higher than the input signal Va, then +Vcc is outputted. When reference chopper wave signal Vb is lower than the input signal Va, then −Vcc is outputted. A frequency of 90 kHz is adopted as the fundamental frequency of the chopper wave reference signal as mentioned before.

An eliminator 30 for eliminating frequency components of the frequency area, which is used by status detector unit, is inserted between output terminal of limiter 29 and input of comparator(PWM modulator) 31. The eliminator 30 comprises of band eliminate filter (BEF), low pass filter (LPF), or so on. The output signal of the comparator 31 is inputted to power amplifier 35 via an optical isolator. In the power amplifier 35, controlled current is generated and supplied to coils of electromagnets for controlling the status of the controlled object.

Current detector 36 detects the controlled current. The detected controlled current signal is feedbacked by current feedback unit 39 to the deviation circuit 27, and subtracting action is carried out therein. The current feedback unit 39 detects low frequency components of the controlled current, which flows in the coils of electromagnets, and feedback the detected frequency components to the input of signal amplifier 28. The current feedback unit 39 comprises of a current detecting and amplifying unit 28a, a low pass filter (LPF) 28b, an offset adjusting unit 28c, a gain adjusting unit 28d and so on. Here, low pass filter (LPF) 28b eliminates frequency components of PWM switching frequencies of the controlled current.

Figure 10:
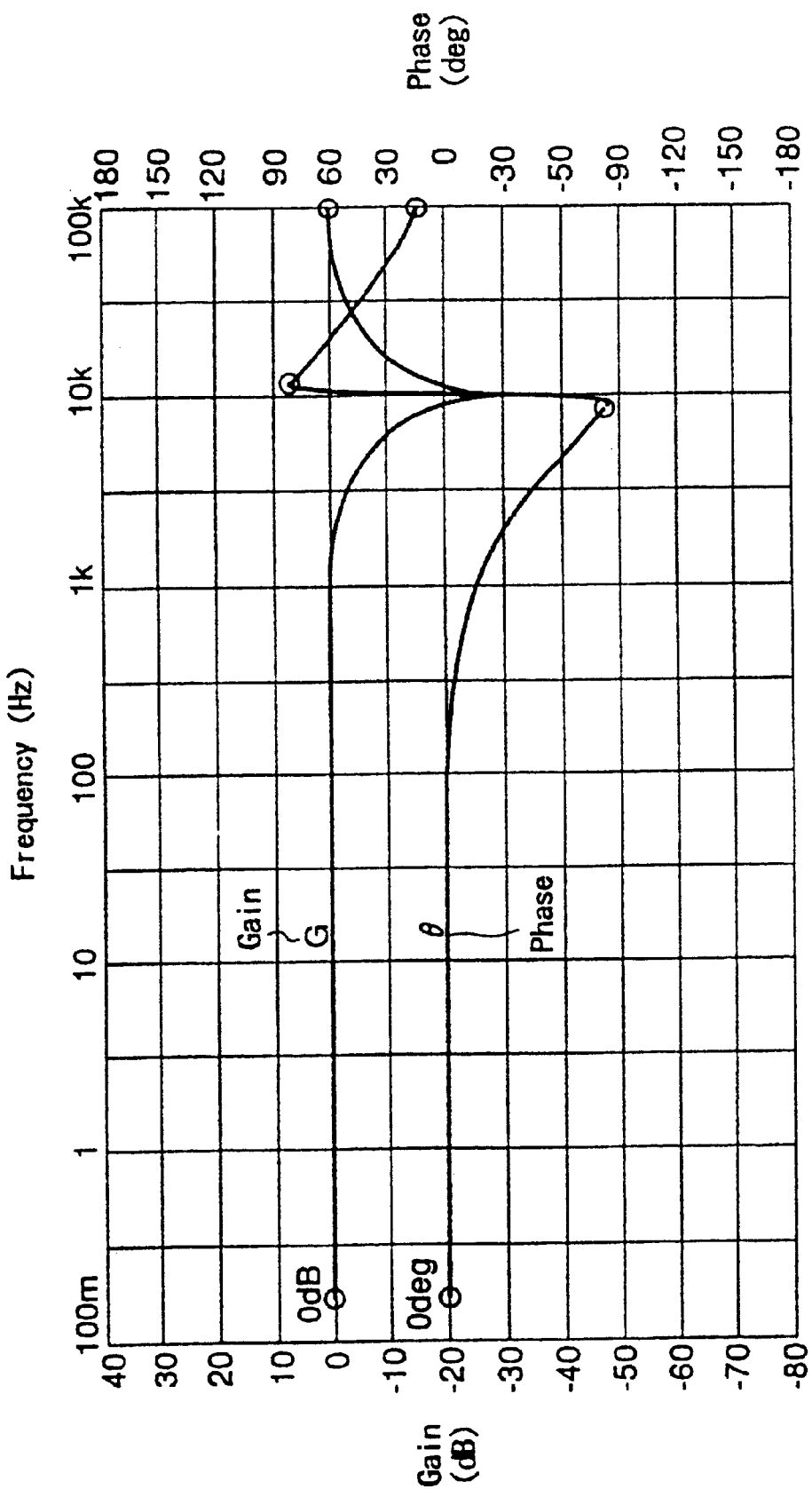
FIG. 10 is a graph showing frequency characteristics of the eliminator shown in FIG. 7.

FIG. 10 shows a frequency characteristics of gain and phase of the band eliminator filter 30, which is inserted at the front end of the PWM modulator 31. In this example, an attenuation of −31 dB is attained at 9.55 kHz. This frequency bandwidth of the attenuation coincides with the frequency bandwidth, which is used by the status detector unit, namely the inductance type displacement sensor in this embodiment.

Figure 3A:
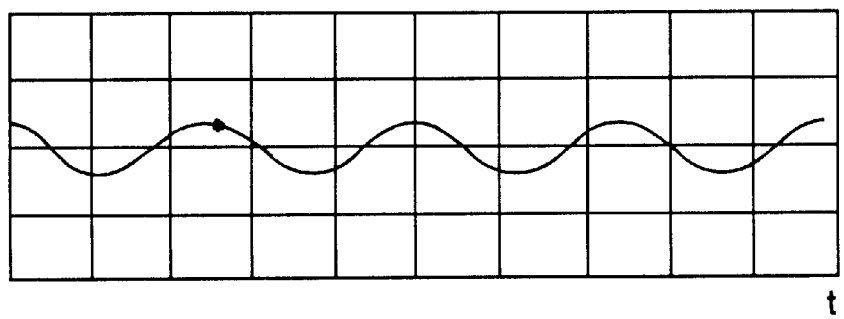
FIG. 3A is a graph of input waveform of 1 kHz sine wave.
Figure 3B:
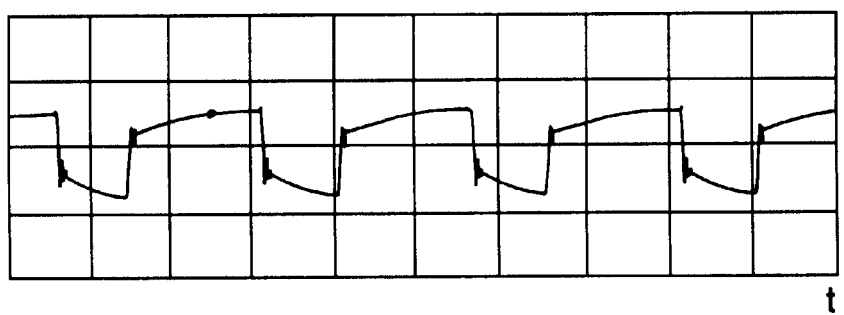
FIG. 3B is a graph of conventional controlled current waveform in the coil of electromagnet.
Figure 3C:
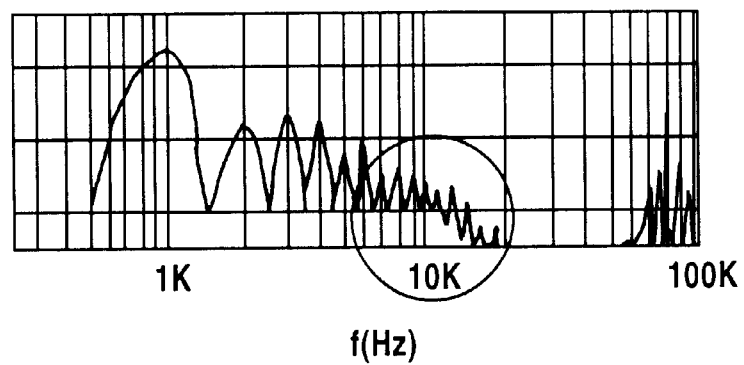
FIG. 3C is a graph of conventional frequency spectrum distribution of the controlled current.
Figure 4A:
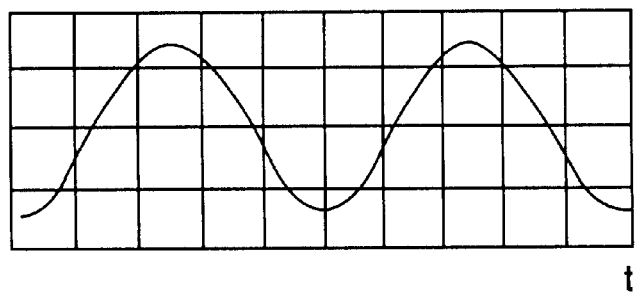
FIG. 4A is a graph of input waveform of 500 Hz sine wave.
Figure 4B:
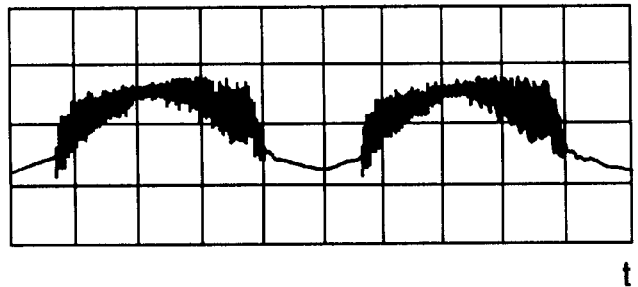
FIG. 4B is a graph of conventional controlled current waveform in the coil of electromagnet.
Figure 4C:
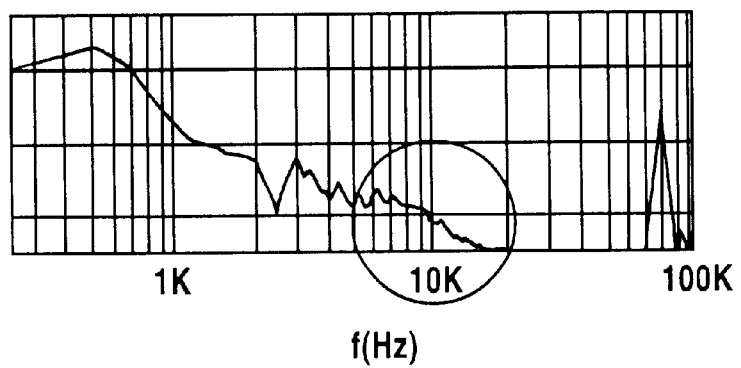
FIG. 4C is a graph of conventional frequency spectrum distribution of the controlled current.

Accordingly, the frequency area of fundamental frequency and nearby used by the inductance type displacement sensor is eliminated by the band eliminator filter 30. As mentioned before, the output waveform of the signal amplifier 28 and the limiter 29 is deformed from the input signal of sine waveform to be rectangular shaped waveform including large amount of n times harmonics components. Then, in the frequency spectrum distribution, the harmonics components of the controlled current extend to the frequency area which is used by the inductance type displacement sensor as shown in FIG. 3C or FIG. 4C. By the band eliminator filter 30, the harmonics components of the output signal of the signal amplifier unit 13 are eliminated at nearby 10 kHz, and then the input signal to the power amplifier unit 14 does not contain the frequency components of such frequency area. The signal now does not contain harmonics components, which coincide with the frequency area that is used by the status detector unit. Then the signal is pulse width modulated by comparator 31 and supplied to the coils of electromagnets 21 via power amplifier 35 as controlled current for generating controlled magnetic force applied to the rotating body. Thus, the inductance type displacement sensor as a status detector unit does not detect the frequency components of the frequency area of nearby fundamental frequency thereof, and is able to detect the displacement of the rotating body 22 without any disturbance by harmonics components of controlled current.

Figure 5:
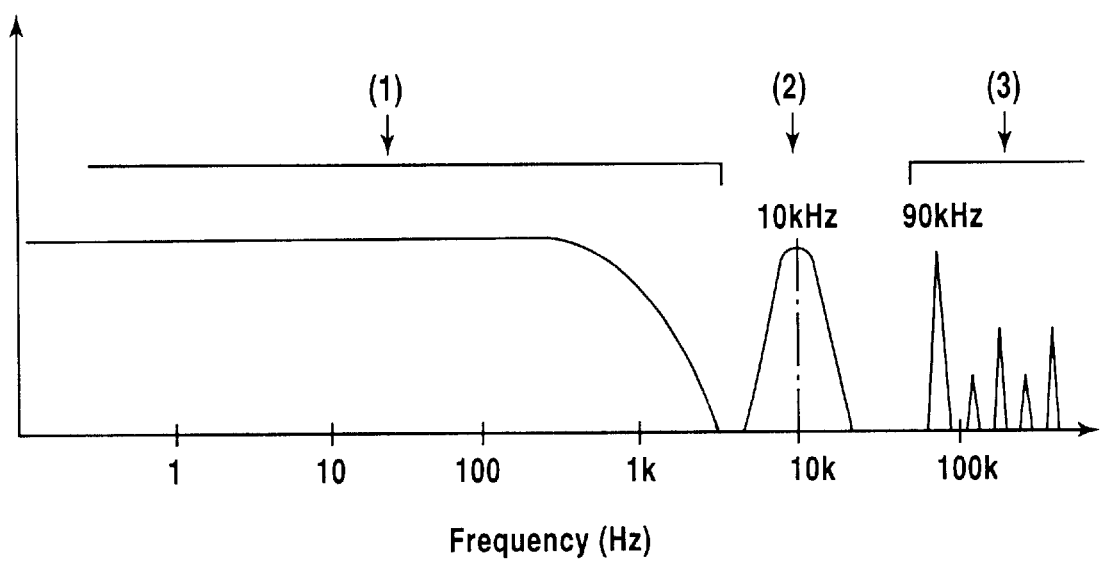
FIG. 5 is a graph showing frequency area ① that is originally used by controlled current in the coil of electromagnet, frequency area ② that is used by the status detector (displacement sensor), and frequency area ③ that is used by PWM waveform of the controlled current.
Figure 6:
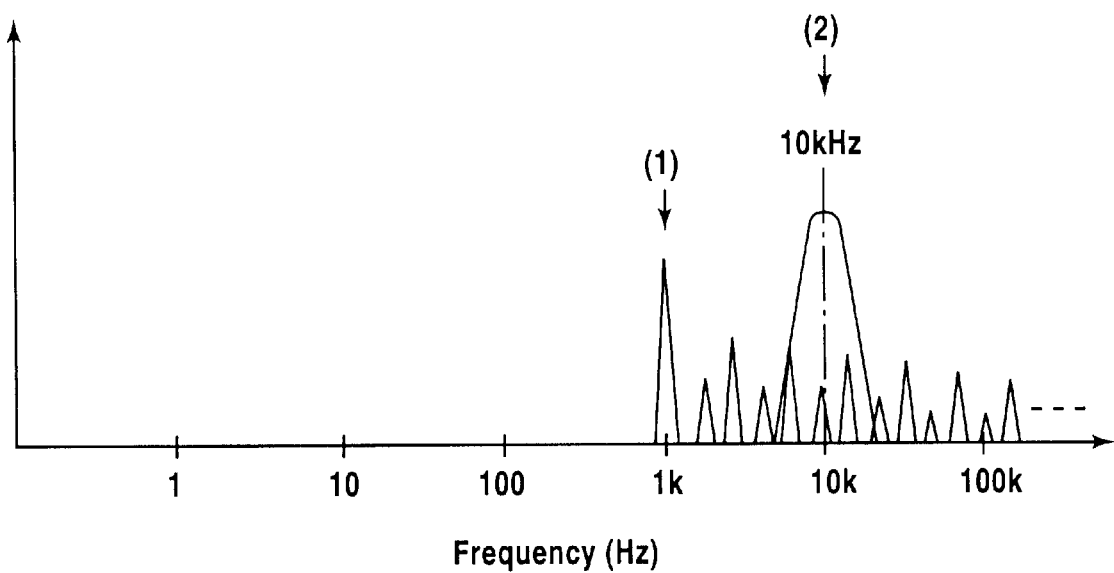
FIG. 6 is a graph showing the frequency area, where the frequency area ① and the frequency area ② are superimposed with each other according to the conventional controller.

Accordingly, the problem is solved that harmonics components of the controlled current fall on the frequency area that is used by the displacement sensor as shown in FIG. 6. Both frequency areas of area ① and area ② are clearly separated as shown in FIG. 5. Then the inductance type displacement sensor is prevented from being disturbed by the harmonics components, and malfunctional operations are prevented. It gives the controller to control the rotating body stably to be levitated at the command position even though outer disturbance is applied.

Figure 11A:
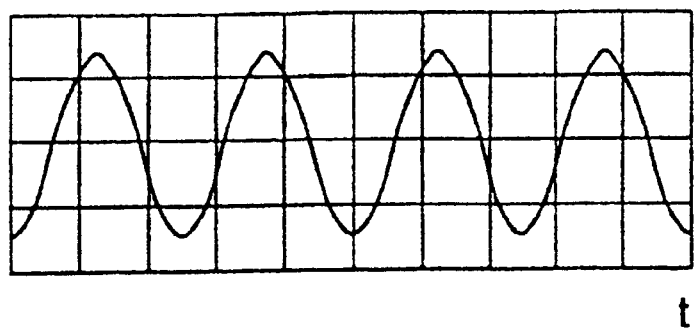
FIG. 11A is a graph of input waveform of 1 kHz sine wave.
Figure 11B:
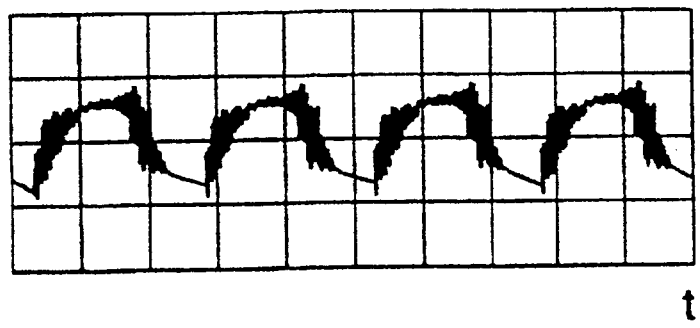
FIG. 11B is a graph of controlled current waveform in the coil of electromagnet.
Figure 11C:
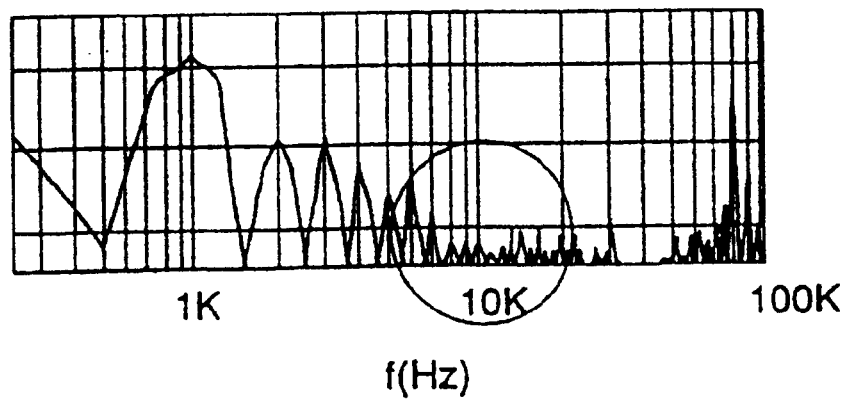
FIG. 11C is a graph of frequency spectrum distribution of the controlled current, according to the present invention respectively.

FIGS. 11A through 11C show experimental results of the magnetic bearing controller which inserts the eliminator in front of the PWM modulator therein. FIG. 11A shows an input signal waveform of 1 kHz sine wave of the signal amplifier unit. FIG. 11B shows a waveform of controlled current, which flows in coils of electromagnets corresponding to the input signals of FIG. 11A. FIG. 11C shows frequency spectrum distribution of the controlled current corresponding to the controlled current of FIG. 11B. As shown in FIG. 11B, the edge of the rectangular shaped waveform becomes rounder shaped with loosing square portion thereof, comparing to FIG. 5B, and closing to the waveform of input sine wave form. Also as shown in FIG. 11C, frequency components of nearby 10 kHz frequency area are respectively reduced in the frequency spectrum distribution, and the frequency area is used by the inductance type displacement sensor.

Figure 12A:
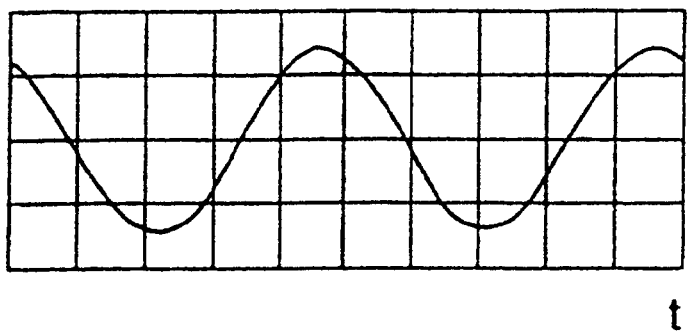
FIG. 12A is a graph of input waveform of 500 Hz sine wave.
Figure 12B:
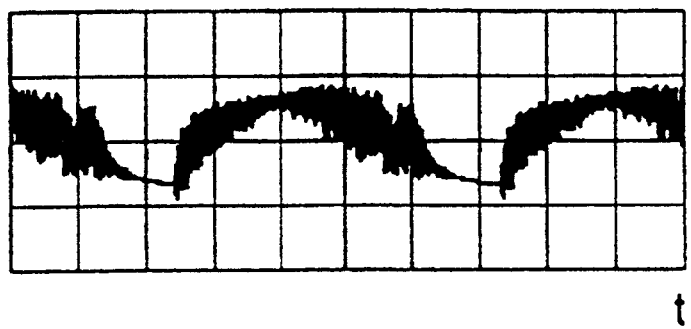
FIG. 12B is a graph of controlled current waveform in the coil of electromagnet.
Figure 12C:
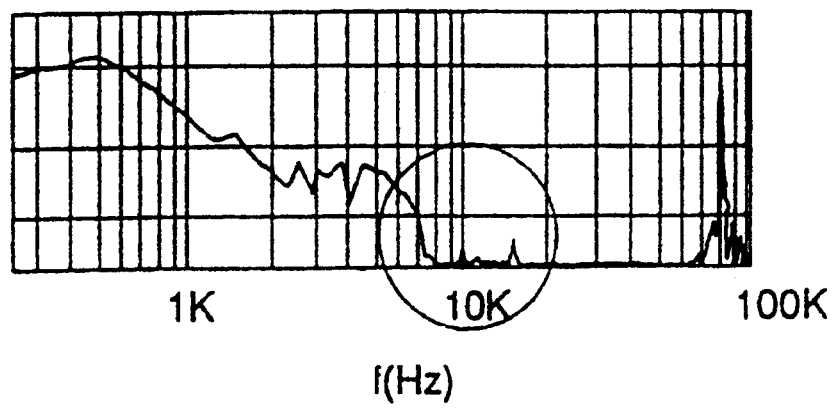
FIG. 12C is a graph of frequency spectrum distribution of the controlled current, according to the present invention respectively.

FIGS. 12A through 12C show the same experimental result when input signal is a sine wave of 500 Hz. As shown in FIG. 12B, the edge portion of rectangular waveform becomes rounder than the edge portion of FIG. 11B. As shown in FIG. 12C, harmonics components of controlled current are remarkably reduced at more than 1 kHz frequency area in frequency spectrum distribution, and almost zero at the frequency area nearby at 10 kHz which is used by the inductance type displacement sensor.

When the magnetic force is applied to the rotating body through thin stainless steel sheet, for example, in can encapsulated magnetic bearing, the fundamental frequency of inductance type displacement sensor should be lower to avoid eddy current loss by the stainless steel sheet. Therefore, frequency area ① and frequency area ② become closer as shown in FIG. 5, and it causes a problem that harmonics noises of frequency area ① fall on frequency area ② to disturb stable operation of magnetic bearing. In some serious cases, controlled current amplified by power amplifier unit contains harmonic noises in the frequency area ② so many that the magnetic bearing cannot work to levitate the rotating body. According to the present invention, harmonic components of controlled current are eliminated in frequency area ② which is used by the inductance type displacement sensor. Therefore, it enables to use relative low frequency area ② of about 10 kHz as fundamental frequency of inductance type displacement sensor without causing any problem.

In the above mentioned embodiment, single band eliminating filter having about −30 dB attenuation is inserted, however it may be possible to insert the filters at plural steps. It will provide more perfect elimination of n times harmonic components of controlled current by increasing attenuation and bandwidth thereof. It is also possible to adopt low pass filter (LPF) instead of band eliminate filter (BEF), and then the same results are expectable.

According to the present invention, an eliminator is inserted between the signal amplifier unit and the power amplifier unit having PWM circuit for eliminating frequency components of frequency area, which is used by the status detector unit. The harmonic components of the controlled current are prevented from being fallen on the frequency area, which is used by the status detector unit. Therefore, it enables stable operation of magnetic bearing controller in which rotating body is levitated by controlled magnetic force at exact command position even if outer disturbing forces are applied thereto.

INDUSTRIAL APPLICABILITY

The present invention is useful for magnetic bearings, which are installed in the rotary machines for supporting the rotating body without contact. The rotary machines having magnetic bearings are suitable for use in many industrial applications.

What is claimed is:

1. A method for controlling a magnetic bearing device comprising:

detecting a position of a levitated body by a status detector unit, which uses a modulated signal of a certain fundamental frequency;

eliminating frequency components of a frequency area around and coincident with said fundamental frequency; and levitating said body at a predetermined position by magnetic force generated by an electromagnet.

2. A method according to claim 1, wherein said electromagnetic bearing device has a power amplifier unit for supplying controlled current to said electromagnet, said controlled current being pulse width modulated; and a signal amplifier unit for amplifying signal before inputting to said power amplifier.

3. A method according to claim 2, wherein an eliminator is inserted between said signal amplifier unit and said power amplifier unit.

4. A method according to claim 2, wherein said power amplifier unit is provided with a pulse width modulation circuit which comprises a comparator for comparing an input signal with chopper wave signal, and said eliminator is connected at the front end of said comparator.

5. A method according to claim 2, wherein said status detector is an inductance type displacement sensor.

6. A method according to claim 2, wherein said eliminator is a band eliminator filter.

* * * * *